March 31, 1964  S. G. MARRIOTT  3,126,813
SELF-ADJUSTING WEIGHTS FOR TOASTING MACHINE
Filed Feb. 14, 1963  2 Sheets-Sheet 1

*INVENTOR.*
SHERMAN G. MARRIOTT
BY
*F. R. Geisler,*
ATTORNEY

INVENTOR.
SHERMAN G. MARRIOTT
ATTORNEY

United States Patent Office 3,126,813
Patented Mar. 31, 1964

3,126,813
SELF-ADJUSTING WEIGHTS FOR TOASTING MACHINE
Sherman G. Marriott, 3800 NE. Alameda, Portland, Oreg.
Filed Feb. 14, 1963, Ser. No. 258,526
5 Claims. (Cl. 99—349)

This invention relates in general to toasting machines of the type described in U.S. Letters Patent No. 2,225,068, issued December 17, 1940; U.S. Letters Patent No. 2,703,521, issued March 8, 1955, and U.S. Letters Patent No. 3,003,099, issued May 8, 1962; in the devices of which patents the half-buns or other bread products being toasted are moved along on a heated toasting plate, and in which devices weights are caused to rest on the top side of the articles being toasted in order to keep the bottom side of each article flat against the toasting plate as the article travels through the device.

As is well-known, with such toasters it is desirable to have some means for exerting a moderate downward pressure on the article during its toasting in order to prevent the tendency of the face which is being toasted to become concaved or otherwise curved, which would result in uneven toasting of such face. In the devices of the prior patents above mentioned traveling disc weights are provided which are arranged so as to ride on the half-buns in order to keep the faces which are being toasted flat against the hot toasting plate. These disc weights however are designed for use only with buns and only with buns within a very limited range of size. When attempts have been made to toast slices of bread or other bread products of different sizes and shapes and thicknesses in these machines these particular disc weights have not worked satisfactorily, due to the fact that, by not being properly synchronized or in proper registration with the articles they are intended to engage, they press down only on portions of the articles or dig into the articles, or miss them altogether, with the result that the toasting takes place even more unsatisfactorily than if no weights whatever were used.

The object of the present invention is to provide improved weights for such toasting machines which will exert downward pressure on the articles being toasted and which will be self-adjusting to the extent of accommodating themselves to articles of any size, shape or thickness as these articles are moved along on the toasting plate in the machine during the toasting operation.

This object and other advantages are achieved by providing a relatively large number of small, specially shaped, hingedly mounted, toasting weights, spaced close together, and so arranged and shaped that they will accommodate themselves to any articles on the toasting plate with which they are brought into contact, as hereinafter briefly described.

In the following description reference is made to the accompanying drawings in which.

Figure 2:
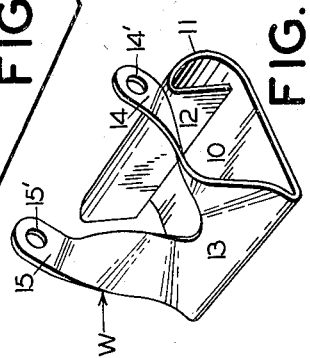
FIG. 2 is a perspective view of one of the weights in FIG. 1, shown by itself and drawn to a larger scale.

In the drawings, each of the weights is indicated by the reference character W. Since these weights are all identical it will suffice to describe one of them as shown in FIG. 2.

Each weight is made from a strip of sheet metal, preferably about two inches wide, and the metal used being preferably stainless steel, although other sheet metal may also be used. The strip of sheet metal is formed into the shape shown in FIG. 2, thus with a flat bottom wall 10, having a preferred size of approximately 2 inches square, an upwardly curved front wall 11, which is substantially semi-cylindrical in shape, which terminates in a downwardly-extending inside flange 12 extending in the plane substantially perpendicular to the plane of the bottom wall 10. A rear wall 13 extends upwardly obliquely inwardly or forwardly from the rear end of the bottom wall and has a central cut-out portion so as to be formed into two identical oppositely arranged side suspension arms 14 and 15, each of which is given a 90° twist so as to cause the side arms to have terminating upper end portions extending in parallel vertical planes. These upper end portions are provided with apertures 14′ and 15′ respectively for receiving a hinge shaft. The apertures 14′ and 15′ are so positioned with respect to the center of gravity of the weight that, when these arms are hingedly mounted on a horizontal hinge shaft and the weight is hanging freely from the hinge shaft the bottom wall 10 will be in a substantially horizontal plane.

Figure 1:
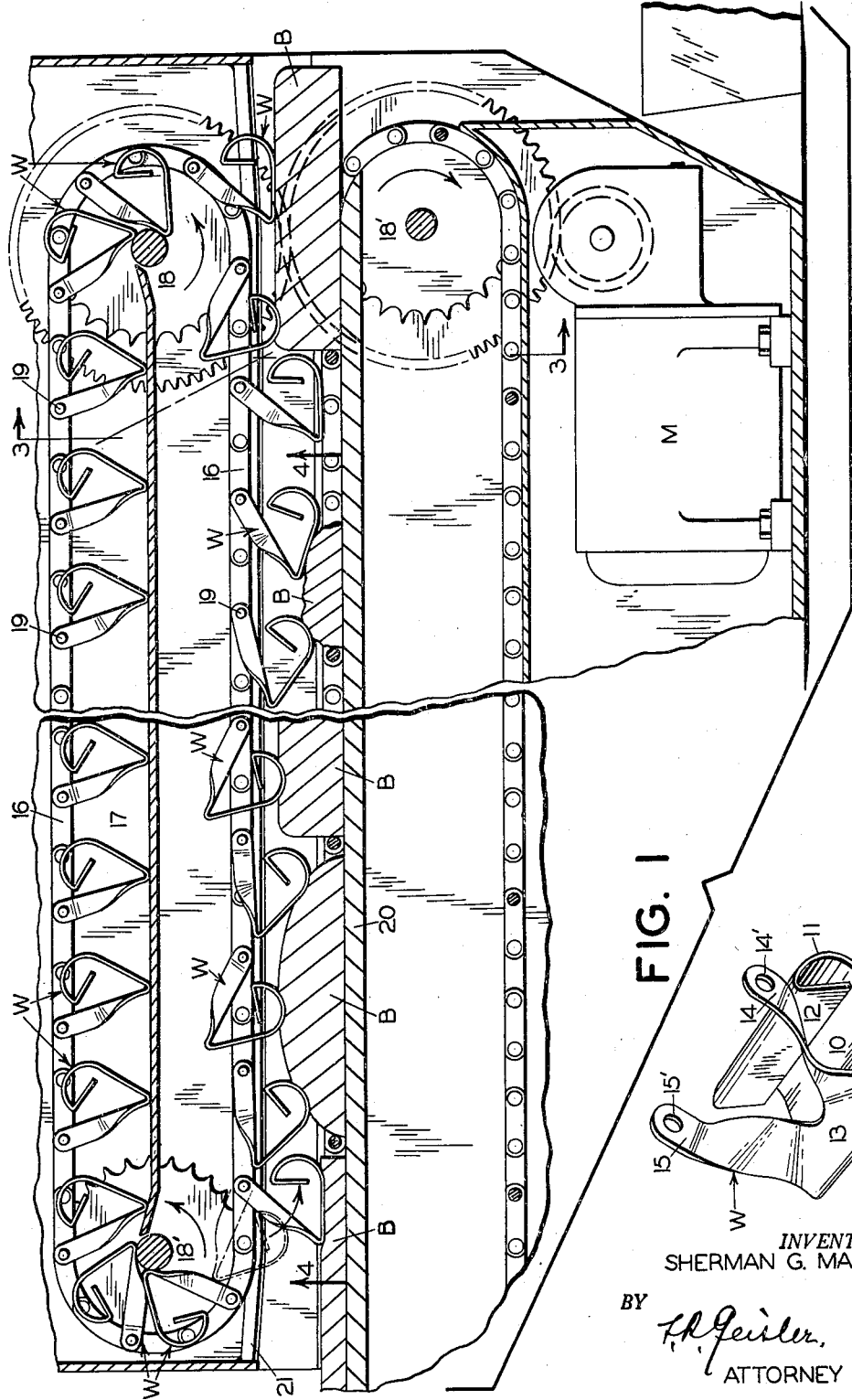
FIG. 1 is a fragmentary sectional elevation of a portion of a toasting machine of the type previously mentioned, showing various sizes of bread products being moved along towards the end of the toasting plate with these products held down against the toasting plate by the special weights of the present invention.

A pair of endless chains 16, one of which is shown in FIG. 1, extend in parallel vertical planes on opposite sides in the upper housing 17 of the toasting machine, and pass around driven sprockets 18 at one end of their course and around idler sprockets 18′, one of which is shown in FIG. 1, at the other end of their course, the sprockets 18 being driven in unison by suitable driving means (not shown).

Figure 3:
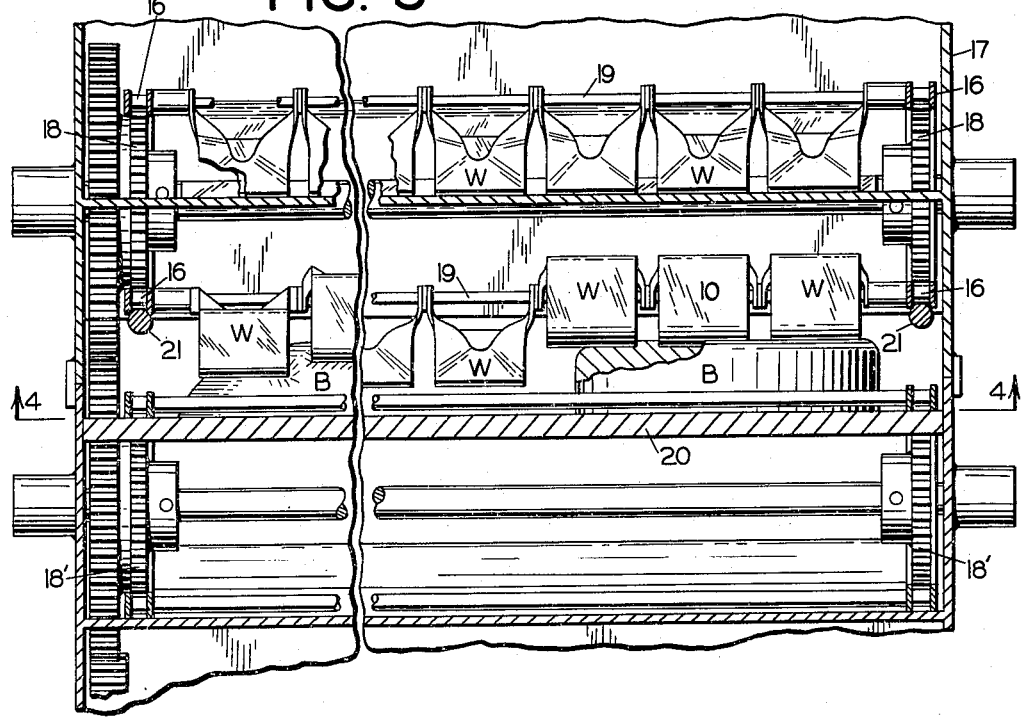
FIG. 3 is a transverse section on line 3—3 of FIG. 1.
Figure 4:
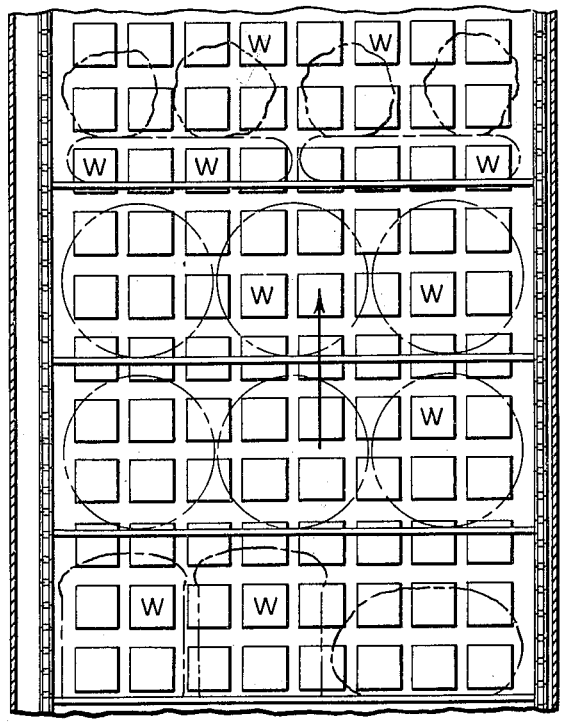
FIG. 4 is a fragmentary section on line 4—4 of FIG. 3 with the various bread products which might be moved along the toasting plate beneath the weights being indicated by broken lines.

At regularly spaced intervals the pair of chains 16 are connected by transversely extending shafts 19 (FIGS. 1 and 3) on each of which a plurality of weights W are hingedly carried in close spaced relationship, as indicated in FIGS. 3 and 4, the hinge shafts carrying suitable spacer sleeves to prevent any lateral shifting of the weights.

As indicated in FIG. 1 (and also in FIG. 4) the transversely extending hinge shafts 19 are spaced apart along the pair of chains 16 at regular distances, the spacing being slightly greater than the maximum distance which each weight extends in the direction of travel when hanging freely from its hinge shaft. Thus if the weights, while carried along with the bottom course of the chains 16 were all to hang freely they would be arranged in the symmetrical pattern illustrated in FIG. 4. As a result of the closely spaced arrangement of the weights W there will be a plurality of weights bearing down on each object being toasted, except in the case of exceedingly small objects, with the result that pressure will be exerted substantially over the entire tops of the articles being toasted.

The conveying chains 16 are so positioned with respect to the toasting plate 20 that, when the weights hang freely below the bottom course of the chains 16, the bottom walls 10 of the weights will be spaced a less distance above the toasting plate 20 than the thinnest slice of bread which would be likely to be toasted in the machine. A pair of stationary guide bars 21 (FIGS. 1 and 3) are provided for the bottom course of the chains 16 in order to maintain the chains and hinge shafts 19 in a plane parallel to the toasting plate 20.

In FIGS. 1 and 3 the various articles which are being toasted are indicated by the reference character B, and these are illustrated in various shapes and sizes. The articles which are being toasted are moved along on the toasting plate 20 by conveyor means including chains connected at regular intervals by transverse rods which engage the articles being toasted and push them along on the toasting plate. Such conveyors in toasting machines are well-known and need not be described further. Similar conveyors for the buns being toasted are described in the prior U.S. patents previously referred to. In FIG. 1 the conveyor means for these bread articles is indicated as being driven by connection with a motor M, and the chains 16, carrying the hinge shafts 19 for the weights W, are driven by suitable gear connections with the driving means for the conveying means for the bread products, the arrangement being such of course that the weights W will travel forwardly with the lower course of the chains 16 at the same speed as the conveying means for the products on the toasting plate.

It will be noted from FIG. 1 that, as each weight W engages a bread product moving along the toasting plate, the curved front wall 11 of the weight contacts the bread product first. The fact that this front wall is curved plus the fact that each weight itself is small and only moderately heavy will prevent any possibility of the weight digging into the top surface of the bread product. The fact that the weights are relatively small and are spaced close together will also result in a plurality of weights pressing down on large bread products and thus combining to produce the desired effect on the bread products regardless of the space which the bread products occupy on the toasting plate. Furthermore the weights automatically adjust themselves to accommodate the thickness of the bread products which they engage and, whenever possible, present their flat bottom surfaces to the top of the bread products. This is important in enabling thin slices of bread to be toasted in the same machine along with bun-halves and other bread products, preventing the thin slices of bread from becoming curved and unevenly toasted. Also, due to the arrangement of the weights W, the operator is not required to set the products in any particular arrangement in the conveyor on the toasting plate since all objects moving along the toasting plate will be properly engaged by one or more weights regardless of their location in the conveying means by which they are moved along through the toasting machine and regardless of their size and shape.

I claim:

1. In a toasting machine wherein the articles being toasted are moved along on a toasting plate, improved means for holding the articles pressed down against the toasting plate during their toasting including an endless conveyor positioned above the toasting plate and moving in unison with the articles being toasted, transversely extending hinge shafts in said conveyor, a plurality of identical weights carried by each shaft, each of said weights having a substantially flat bottom wall portion, a curved front wall extending upwardly from said bottom wall, a rear wall extending upwardly and inwardly from the rear of said bottom wall, and hinge means at the top of said rear wall for hingedly mounting the weight on the hinge shaft, said conveyor so positioned with respect to said toasting plate that said bottom wall portions of said weights will be spaced only a slight distance above said toasting plate when said weights are in lowest position.

2. In a toasting machine wherein the articles being toasted are moved along on a toasting plate, improved means for holding the articles pressed down against the toasting plate during their toasting including an endless conveyor positioned above the toasting plate and moving in unison with the articles being toasted, transversely extending hinge shafts in said conveyor, a plurality of identical weights carried by each hinge shaft, each of said weights having a substantially flat bottom wall portion, a curved front wall extending upwardly from said bottom wall, a rear wall extending upwardly and inwardly from the rear of said bottom wall, said rear wall formed with a pair of arms in opposite sides respectively, said arms hingedly mounted on the hinge shaft, and said conveyor so positioned with respect to said toasting plate that said bottom wall portions of said weights will be spaced only a slight distance above said toasting plate when said weights are at lowest position.

3. In a toasting machine wherein the articles being toasted are moved along on a toasting plate, improved means for holding the articles pressed down against the toasting plate during their toasting comprising an endless conveyor positioned above the toasting plate and moving in unison with the articles being toasted, transversely extending hinge shafts in said conveyor, a plurality of identical weights carried by each hinge shaft, each of said weights having a substantially flat bottom wall portion, a curved front wall extending upwardly from said bottom wall, a rear wall extending upwardly and inwardly from the rear of said bottom wall, said rear wall formed with a pair of arms in opposite sides respectively, the top ends of said arms extending in substantially parallel vertical planes, said arms pivotally mounted on the hinge shaft, said pivotal mounting for said arms so located with respect to the center of gravity of said weight that when said weight is suspended freely from its hinge shaft said bottom wall portion will extend in a plane substantially parallel to said toasting plate, and said conveyor so positioned with respect to said toasting plate that said bottom wall portions of said weights will be spaced only a slight distance above said toasting plate when said weights are in lowest position.

4. In a toasting machine wherein the articles being toasted are moved along on a toasting plate, improved means for holding the articles pressed down against the toasting plate during their toasting comprising an endless conveyor positioned above the toasting plate and moving in unison with the articles being toasted, transversely extending hinge shafts in said conveyor, a plurality of identical weights carried by each hinge shaft, each of said weights having a substantially flat bottom wall portion, a curved front wall extending upwardly from said bottom wall, a flange extending downwardly inwardly from the top of said front wall, a rear wall extending upwardly and inwardly from the rear of said bottom wall, hinge means at the top of said rear wall for hingedly mounting the weight on the hinge shaft, said hinge means so located with respect to the center of gravity of said weight that when said weight is suspended freely from its hinge shaft said bottom wall portion will extend in a substantially horizontal plane, and said conveyor so positioned with respect to said toasting plate that said bottom wall portions of said weights will be spaced only a slight distance above said toasting plate when said weights are in lowest position.

5. In a toasting machine wherein the articles being toasted are moved along on a toasting plate, improved means for holding the articles pressed down against the toasting plate during their toasting consisting of an endless conveyor positioned above the toasting plate and moving in unison with the articles being toasted, transversely extending hinge shafts in said conveyor, the length of said shafts corresponding approximately to the width of said toasting plate, a plurality of identical weights carried by each hinge shaft, each of said weights having a substantially flat bottom wall portion, an approximately semi-cylindrical front wall extending upwardly from said bottom wall, a flange extending downwardly inwardly from the top of said front wall, a rear wall extending upwardly and inwardly from the rear of said bottom wall, said rear wall formed with a pair of arms in opposite sides respectively, the top ends of said arms extending in substantially parallel planes, said arms pivotally mounted on the hinge shaft, said pivotal mounting for said arms so located with respect to the center of gravity of said weight that when said weight is suspended freely from its hinge shaft said bottom wall portion will extend in a plane substantially parallel to said toasting plate, said conveyor so positioned with respect to said toasting plate that said bottom wall portions of said weights will be spaced only a slight distance above said toasting plate when said weights are in lowest position, said bottom wall portion of each plate not exceeding three inches in length or width, the spacing between consecutive hinge shafts in said conveyor being not greater than two inches more than the length of said bottom wall of each weight, and the weights on each hinge shaft spaced only a fraction of an inch from each other, whereby said weights will automatically accommodate various sizes and shapes of articles on said toasting plate which they contact.

References Cited in the file of this patent

UNITED STATES PATENTS

| | | |
|---|---|---|
| 1,887,699 | Reid | Nov. 15, 1932 |
| 1,946,023 | Jones | Feb. 6, 1934 |
| 2,225,068 | Marriott | Dec. 17, 1940 |
| 2,703,521 | Marriott | Mar. 8, 1955 |
| 3,033,099 | Marriott | May 8, 1962 |

FOREIGN PATENTS

| | | |
|---|---|---|
| 508,541 | Germany | Sept. 27, 1930 |
| 858,495 | France | May 13, 1940 |